United States Patent
Chang et al.

(10) Patent No.: US 10,331,560 B2
(45) Date of Patent: Jun. 25, 2019

(54) CACHE COHERENCE IN MULTI-COMPUTE-ENGINE SYSTEMS

(71) Applicant: Hewlett Packard Enterprise Development LP, Houston, TX (US)

(72) Inventors: Jichuan Chang, Palo Alto, CA (US); Sheng Li, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/113,960

(22) PCT Filed: Jan. 31, 2014

(86) PCT No.: PCT/US2014/014259
§ 371 (c)(1),
(2) Date: Jul. 25, 2016

(87) PCT Pub. No.: WO2015/116199
PCT Pub. Date: Aug. 6, 2015

(65) Prior Publication Data
US 2016/0342516 A1 Nov. 24, 2016

(51) Int. Cl.
*G06F 12/08* (2016.01)
*G06F 12/0815* (2016.01)
(Continued)

(52) U.S. Cl.
CPC ........ *G06F 12/0815* (2013.01); *G06F 12/084* (2013.01); *G06F 12/0817* (2013.01);
(Continued)

(58) Field of Classification Search
CPC ............... G06F 12/0815; G06F 12/084; G06F 2212/1032; G06F 2212/1041; G06F 2212/281; G06F 12/0817; G06F 12/1027
See application file for complete search history.

(56) References Cited

U.S. PATENT DOCUMENTS 6,363,458 B1 * 3/2002 Park .................... G06F 12/0813
709/213
6,711,651 B1 * 3/2004 Moreno .............. G06F 12/0815
711/137

(Continued)

OTHER PUBLICATIONS

Agarwal, N. et al., In-network Coherence Filtering: Snoopy Coherence Without Broadcasts, (Research Paper), Dec. 12-16, 2009, 12 Pgs.

(Continued)

*Primary Examiner* — Hiep T Nguyen
(74) *Attorney, Agent, or Firm* — Hewlett Packard Enterprise Patent Department

(57) ABSTRACT

Methods and systems for providing cache coherence in multi-compute-engine systems are described herein. In on example, concise cache coherency directory (CDir) for providing cache coherence in the multi-compute-engine systems is described. The CDir comprises a common pattern aggregated entry for one or more cache lines from amongst a plurality of cache lines of a shared memory. The one or more cache lines that correspond to the common pattern aggregated entry are associated with a common sharing pattern from amongst a predetermined number of sharing patterns that repeat most frequently in the region.

6 Claims, 12 Drawing Sheets

400

| Aggregated Cache Line ID 404 | Pattern Vector 406 | Sharing Pattern 410 |
|---|---|---|
| $CL_0, CL_1, CL_m$ | 01 | 1 0 1 1 0 0 |
| $CL_2, CL_4, CL_{m-1}$ | 10 | 0 0 1 1 0 0 |
| $CL_3, CL_5$ | 11 | 1 0 1 1 1 1 |
| $CL_6, CL_7$ | 00 | Pointer 412 |

402

(51) Int. Cl.
  *G06F 12/0817*  (2016.01)
  *G06F 12/084*   (2016.01)
  *G06F 12/1027*  (2016.01)

(52) U.S. Cl.
  CPC .. *G06F 12/1027* (2013.01); *G06F 2212/1032* (2013.01); *G06F 2212/1041* (2013.01); *G06F 2212/281* (2013.01)

(56) References Cited

U.S. PATENT DOCUMENTS

| | | | |
|---|---|---|---|
| 2003/0079085 A1* | 4/2003 | Ang | G06F 12/0817 |
| | | | 711/122 |
| 2004/0030841 A1 | 2/2004 | Nanda et al. | |
| 2008/0010408 A1* | 1/2008 | Shen | G06F 12/0864 |
| | | | 711/118 |
| 2008/0195820 A1 | 8/2008 | Lais et al. | |
| 2010/0274971 A1 | 10/2010 | Solihin | |
| 2013/0097385 A1 | 4/2013 | Beckmann et al. | |
| 2013/0097387 A1 | 4/2013 | Sanchez Martin et al. | |
| 2013/0254488 A1 | 9/2013 | Kaxiras et al. | |
| 2014/0006714 A1* | 1/2014 | Cherukuri | G06F 12/0817 |
| | | | 711/128 |
| 2014/0032848 A1 | 1/2014 | Zhao et al. | |
| 2017/0046263 A1* | 2/2017 | Solihin | G06F 12/0811 |

OTHER PUBLICATIONS

Basu, A. et al., CMP Directory Coherence: One Granularity Does Not Fit All, (Research Paper), Jul. 11, 2013, 29 Pgs.
Fang, L. et al., Building Expressive, Area-Efficient Coherence Directories, (Research Paper), Jul. 9, 2013, 10 Pgs.
Jerger, N.D.E. et al., Virtual Tree Coherence: Leveraging Regions and In-network Multicast Trees for Scalable Cache Coherence, (Research Paper), Sep. 2, 2008, 12 Pgs.
Moshovos, A. et al., Regionscout: Exploiting Coarse Grain Sharing in Snoop-based Coherence, (Research Paper), Apr. 9, 2005, 12 Pgs.
PCT Search Report/Written Opinion~Application No. PCT/US2014/014259 dated Oct. 30, 2014~10 pages.
Zhao et al., "Space: sharing pattern-based directory coherence for multicore scalability," PACT 2010, pp. 135-146.
Zebchuk et al., "A Framework for Coarse-Grain Optimizations in the On-Chip Memory Hierarchy," Micro 2007, pp. 314-327.
Marty et al., "Virtual hierarchies to support server consolidation," ISCA 2007, Jun. 9-13, 2007, 11 pages.

* cited by examiner

| Aggregated Cache Line Id 404 | Pattern Vector 406 |
|---|---|
| $CL_0, CL_1, CL_m$ | 01 |
| $CL_2, CL_4, CL_{m-1}$ | 10 |
| $CL_3, CL_5$ | 11 |
| $CL_6, CL_7$ | 00 |

| Pattern Vector 406 | Sharing Pattern 410 |
|---|---|
| 01 | 1 0 1 1 0 0 |
| 10 | 0 0 1 1 0 0 |
| 11 | 1 0 1 1 1 1 |

| Aggregated Cache Line ID 404 | Pattern Vector 406 | Sharing Pattern 410 |
|---|---|---|
| $CL_0, CL_1, CL_m$ | 01 | 101100 |
| $CL_2, CL_4, CL_{m-1}$ | 10 | 001100 |
| $CL_3, CL_5$ | 11 | 101111 |
| $CL_6, CL_7$ | 00 | Pointer 412 |

Fig. 4C

CACHE COHERENCE IN MULTI-COMPUTE-ENGINE SYSTEMS

BACKGROUND

The advent of technology has led to an exponential growth in computational power of computing systems. Use of multi-processor devices and multi-core processors, which include a number of cores or processors, in the computing systems, has also contributed to the increase in computational power of computing systems. Each of the cores or processors may include an independent cache memory. Cache coherence refers to the integrity of data stored in each cache of the cores or processors.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

FIG. 4C illustrates a concise cache coherence directory for cache coherence in a multi-compute-engine system, according to an example of the present subject matter.

DETAILED DESCRIPTION

In a multi-compute-engine system, each compute engine, such as a core or a processor, includes an independent cache memory. The cache memory is a smaller, faster memory which stores copies of data from frequently used, main memory locations. Generally, the cache memory eludes instruction and data caches, where the data cache is organized as a hierarchy of one or more cache levels.

Considering an example of a multi-core processing system, each processor may include several cores, each core having its own cache. Thus, multiple copies of the same data from a main memory may be cached concurrently within several or all of these cores. To maintain a consistent view f the main memory by all the cores, all such copies may have to be consistent. Inconsistency cached data stored independently with these cores, may pose various difficulties, for example, in the multi-core processing system.

For example, consider a first and a second core of the multi-core processing system to cache a copy of data (D), in their respective caches simultaneously. A cache coherence problem may arise when the first core modifies its copy of data (D), while the second core simultaneously uses its copy of data (D). Once the first core modifies its copy of data (D), the copy of data (D), held in the cache of the second core is no longer valid. In such a situation, if the second core were to read data (D) from its cache, a wrong value of data (D) would be returned. Cache coherence enables managing such conflicts and maintaining consistency between the cache and the main memory. Cache coherence can be achieved by ensuring that the second core cannot use its copy of data (D) until it is made identical to the modified copy of the data (D) held in the cache of the first core or alternatively, by ensuring that the first core cannot modify its copy of data (D) until the copy of data (D) lip the second core is returned or invalidated.

In multi-compute-engine systems, cache coherence is generally achieved through cache coherence protocols. The cache coherence protocols maintain consistency between all the caches in the multi-compute-engine systems. The cache coherence protocols are classified based on the technique by which they implement cache coherence. There are two types of cache coherence protocols, namely, snooping based protocols and directory based protocols.

The snooping based protocols that involve monitoring of address lines of shared data and a broadcasting of every access that may cause a change in the shared data to all sharers, are not scalable. As the number of sharers, i.e., the number of compute-engines, such as cores or processors, continues to grow, broadcast to all sharers consumes excessive bandwidth.

The directory based protocols, where a directory is implemented as a filter through which each core or processor asks permission to load data from the main memory to its cache, provide another approach to achieve cache coherence in the multi-compute-engine systems.

Figure 1A:
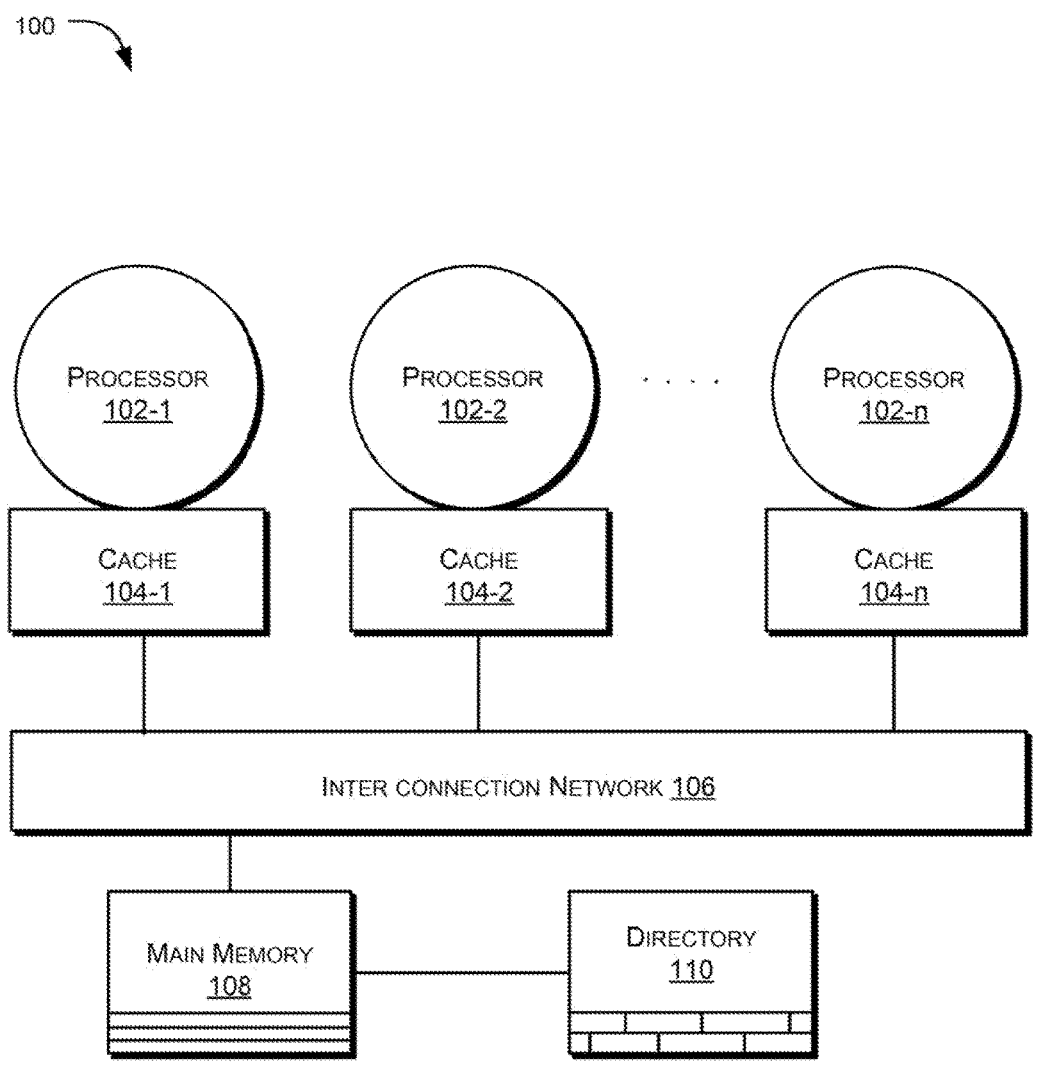
FIG. 1A illustrates a multi-compute-engine system.

FIG. 1A shows a multi-compute-engine system 100. In one example, the multi-compute-engine system 100 may be operable on a directory based protocol to achieve cache coherence. The multi-compute-engine system 100 may be, for example, a multi-processor system, multi-core processor system or a chip-multi processors system. Accordingly, the multi-compute-engine system 100 may comprise multiple processors or cores, based on the configuration of the multi-compute-engine system 100. In an example. the multi-compute-engine system 100 may comprise multiple processors 102-1, 102-2, . . . 102-n, as shown in FIG. 1.

Each of the processors 102-1, 102-2 . . . 102-n, have one or more levels of cache 104-1, 104-2 . . . 104-n associated with them, respectively. An interconnection network 106 allows the processors 102-1, 102-2 . . . 102-n to communicate with each other as well as with a main memory 108 of the multi-compute-engine system 100, in the multi-compute-engine system 100, data of the main memory 108 may be cached by any compute engine of the multi-compute-engine system 100, for example, any of the processors 102-1, 102-2 . . . 102-n. In one example, the multi-computeengine system 100 incorporates a cache coherence directory 110 to provide cache coherence amongst the processors 102-1, 102-2 . . . 102-n.

Figure 1B:
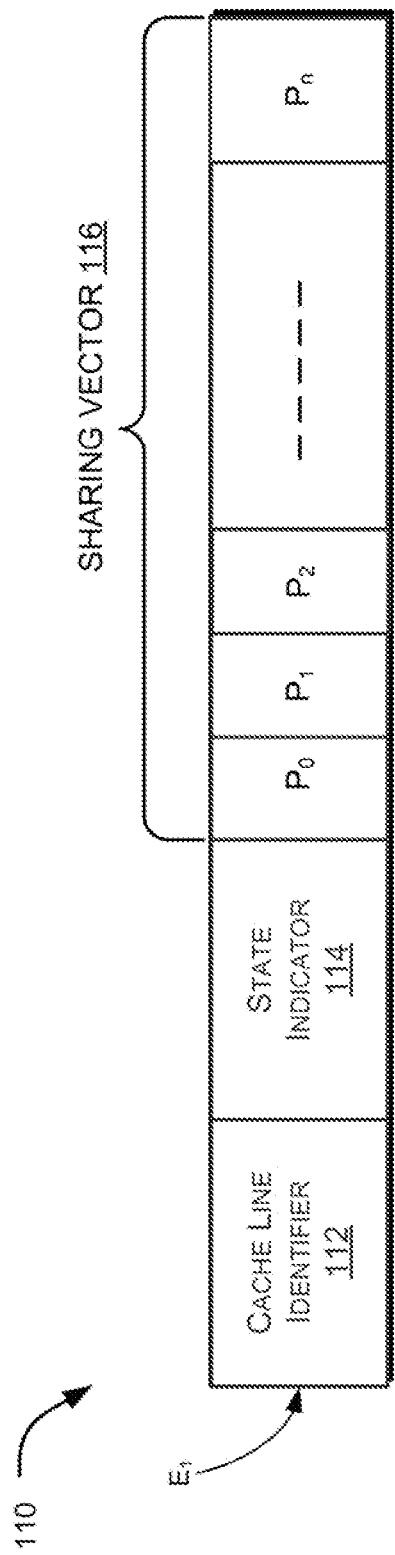
FIG. 1B is a schematic representation of an entry cache coherence directory.

The cache coherence directory 110, also referred to as directory 110, may maintain information about cache coherence on a per-block granularity. For ease of explanation, the directory 110 may be considered to be implemented for a page of the main memory 108 having a size, for example, of 4KB. Further, the page may be considered to be divided into blocks, also referred to as cache lines. For instance, the 4KB page may be divided into blocks of 64 bytes. Accordingly, in the present example, the 4KB page has 64 blocks. The directory 110 includes oneentry per block of the page, and accordingly, in the present example, the directory has 64 entries. Each entry in the directory 110 comprises an identifier of the cache line to which the entry corresponds and a list of processors that may cache the block. FIG. 1B illustrates an entry $E_1$ of the directory 110.

As shown in FIG. 1B, each entry $E_1$ in the directory 110 comprises a cache line identifier 112, state indicator 114. and a sharing vector 116. The cache line identifier 112 is indicative of the memory address of the cache line to which the entry $E_1$ corresponds. The state indicator 114 indicates a state of the cache line. For example, the state indicator 114 may indicate whether a copy of the data, of the cache line in a cache of any of the processors 102-1, 102-2 . . . 102-n is modified, exclusive, shared or invalid. Accordingly, in one example, the state indicator 114 may have a length of 2-bits, wherein the 2-bits may indicate any of the four different states.

The sharing vector 116 is used to indicate sharing of the cache line among any or all of the processors 102-1, 102-2 . . . 02-n. The number of bits in the sharing vector 116 is equal to the number of processors 102-1, 102-2 . . . 102-n, such that each bit in the sharing vector 116 corresponds to a particular processor to indicate presence or absence of the cache line in the cache of that processor. For example, a bit may be set to '1' to indicate the presence and to '0' to indicate the absence of the cache line with respect to the corresponding processor.

Again, merely for the purpose of illustration and not limitation, in one example, the number of processors 102-1, 102-2 . . . 102-n may be considered to be 64. Therefore, in this example, the sharing vector 116 has a length of 64-bits. As evident, the size of the sharing vectors 116 increases with the number of processors 102-1, 102-2 . . . 102-n.

The size of the directory entry associated with each cache line and in turn the size of the directory 110 itself increases linearly in proportion to the increase in the number of processors 102-1, 102-2 . . . 102-n. Without considering the size of the state indicator 114, the size of the directory 110 is m*n. Here 'm' is the number of entries which is equal to the number of cache lines in a page of the memory for which the directory 110 is implemented and 'n' is the number of processors 102-1 102-2 . . . 102-n in the multi-compute-engine system 100.

In general, the size of a cache coherence directory, such as the directory 110, which increases linearly with the increase ire number of processors poses storage overhead difficulties in multi-compute-engine systems with large number of compute-engines. For example, if the number of processors is high, it is not unlikely that the size of the storage required to store the cache coherence directory may exceed the size of the cache used to store the data being tracked by the cache coherence directory to provide cache coherence. Referring to the above example, where the size of the memory page is 4KB, number of cache lines is 64 and the number of processors 102-1, 102-2 . . . 102-n too is 64, the overhead due to the memory consumed by the directory 110 is 12%. However, if, for the same memory page of 4KB having 64 cache lines, the number of processors 102-1. 102-2 . . . 102-n increases to, say, 1024, then the overhead becomes 200%.

The increase in the size of the storage results in an increase in the size, power consumption, and manufacturing cost of such multi-compute-engine systems. Further, the increase in the size of the storage may also adversely affect the performance of the multi-compute-engine systems and add to the energy and latency overheads. Accordingly, although, the directory based protocol provides an enhanced performance compared to the snooping based protocol, the directory based protocol may not be implementable in multi-compute-engine systems with high number of processors owing to the fact that the total or overhead scales in a linear proportion to the number of processors.

Methods and systems for maintaining cache coherence in multi-compute-engine systems to achieve scalability by reducing storage as well as latency overheads are described. In accordance with the present subject matter, a concise cache coherence directory, herein termed as CDir, may be implemented for maintaining cache coherence in the multi-compute-engine systems.

In an example, to achieve reduction in storage size, the size of the sharing vectors included in the CDir as well as the number of entries to the CDir is reduced. In accordance with one example of the present subject matter, the CDir for a shared memory of a multi-compute-engine system, is based on common sharing patterns that occur most frequently in regions of the shared memory. A region may be defined as a continuous portion of memory comprising multiple blocks.

In an example, the implementation of a CDir may be explained in context of a workload, for example, a process or an application executing in the multi-compute-engine system that exhibits region-level sharing pattern and frequent sharing patterns. Region-level sharing pattern is observed where continuous cache lines of a region have a same sharing pattern while frequent sharing patterns are observed when various non-continuous cache lines of the regions the shared memory have a same sharing pattern.

In general, although each cache line of the shared memory may be cached by different sharers and thus each cache line may have a distinct sharing pattern, in case of a workload that exhibits frequent sharing patterns and region level sharing pattern in a coarse-grained region, instead of having a distinct sharing pattern per block, the likelihood of many blocks in a region of the shared memory having a common sharing pattern is high. Accordingly, the number of sharing patterns occurring in a given shared memory may be limited to a small number. The sharing patterns that are common for many blocks in the region and may be referred to as common sharing pattern.

Some of the common sharing patterns may be repeating for a majority of the cache lines while some may be repeated only for few of the cache tines. In accordance with the present subject matter, a predetermined number of most frequently repeating common sharing patterns are identified for representation in the CDir. Sets of cache lines are formed such that each set of cache lines includes the cache lines that have one of the identified common sharing pattern. The CDir includes one aggregated entry for each such set of cache lines. The aggregated entry for a set of cache lines associated with one of the identified common sharing pattern may be referred to as a common pattern aggregated entry. The number of common pattern aggregated entries in the CDir is equal to the predetermined number of most frequently repeating common sharing patterns.

Further, the CDir also aggregates all the cache lines that have a sharing pattern other than the identified common sharing patterns into an entry, referred to as an uncommon pattern aggregated entry. Each of the cache lines that have an uncommon sharing pattern are aggregated into the uncommon pattern aggregated entry. An uncommon sharing patterns may be understood as the a common sharing pattern that repeats for a lesser number of cache lines than the identified predetermined number of common sharing patterns or a distinct sharing pattern, i.e., a sharing pattern that does not repeat for any of the cache lines.

Each entry of the CDir includes a pattern vector mapped to it. The size of pattern vector is in proportion to the predetermined number common sharing patterns that have been selected for representation in the CDir. The pattern vector in each of the common pattern aggregated entry is set to identify the common sharing pattern associated with the set of cache lines that correspond to that entry of the CDir. Further, the pattern vector in the uncommon pattern aggregated entry is set to indicate that the aggregated entry relates to cache lines that have an uncommon sharing pattern, meaning a sharing pattern other than the identified common sharing patterns.

For example, if a CDir for a shared memory is implemented with the consideration that 3 common sharing patterns repeating most frequently, the pattern vector may be a 2-bit vector, where '01', '10' and '11' may represent the common sharing pattern that repeats the highest number of times, second highest number of times and third highest number of times, respectively. Accordingly, the pattern vector included in an common pattern aggregated entry may be set to either '01', '10' or '11' to represent the common sharing pattern associated with the common pattern aggregated entry. In an example, the pattern vector included in the uncommon pattern aggregated entry may be set to '00'.

In one example, the pattern vectors set in the common pattern aggregated entries may be translated into full-map sharing vectors for example, through pointers, translation tables or any other translation schemes to indicate who the sharers are. While, for all the cache lines aggregated in the uncommon pattern aggregated, entry, a per-cache line based directory may be maintained.

Thus, based on the pattern vectors set in an entry of the CDir, it may be determined whether or not a per-cache line based directory should be referenced to identify the sharers. Referring to the previous example, when a pattern vector is set to '01', '10' or '11', a pointer or translation table may be looked-up and for a pattern vector set to '00', the per-cache line based directory may be referenced for obtaining the sharing information In one example, the per-cache line based directory may comprise the sharing information of only those cache lines that have a sharing pattern other than the identified common sharing patterns, or, in other words, an uncommon sharing pattern, Excluding cache lines having the identified common sharing patterns from the per-cache line based directory provides for significant reduction is storage overhead. In one example, the per-cache line based directory may be a full-map sharing vector based directory or a coarse-grained sharing vector based directory.

The size of the CDir is based on the number of most frequently repeating common sharing patterns identified for representation in the CDir. In accordance with one example of a workload that exhibits frequent sharing pattern and region-level sharing pattern, a small number of common sharing patterns are repeated for multiple cache lines. Accordingly, aggregating each set of cache lines that have a common sharing pattern into one entry of the CDir contributes to a significant reduction in the memory overhead involved in providing cache coherence.

Further in accordance with the present subject matter, in one example, owing to the significantly reduced size, the CDir may be cached in a private cache of a processor. This provides for reduction in latency overhead involved in maintaining cache coherency for systems with growing size.

The above methods and systems are further described in conjunction with the FIGS. 2A to 7. It should be noted that the description and figures merely illustrate the principles of the present subject matter. It will thus be understood that various arrangements can be devised that, although not explicitly described or shown herein, embody the principles of the present subject matter and are included within its spirit and scope. Moreover, all statements herein reciting principles, aspects, and embodiments of the present subject matter, as well as specific examples thereof, are intended to encompass equivalents thereof.

Figure 2A:
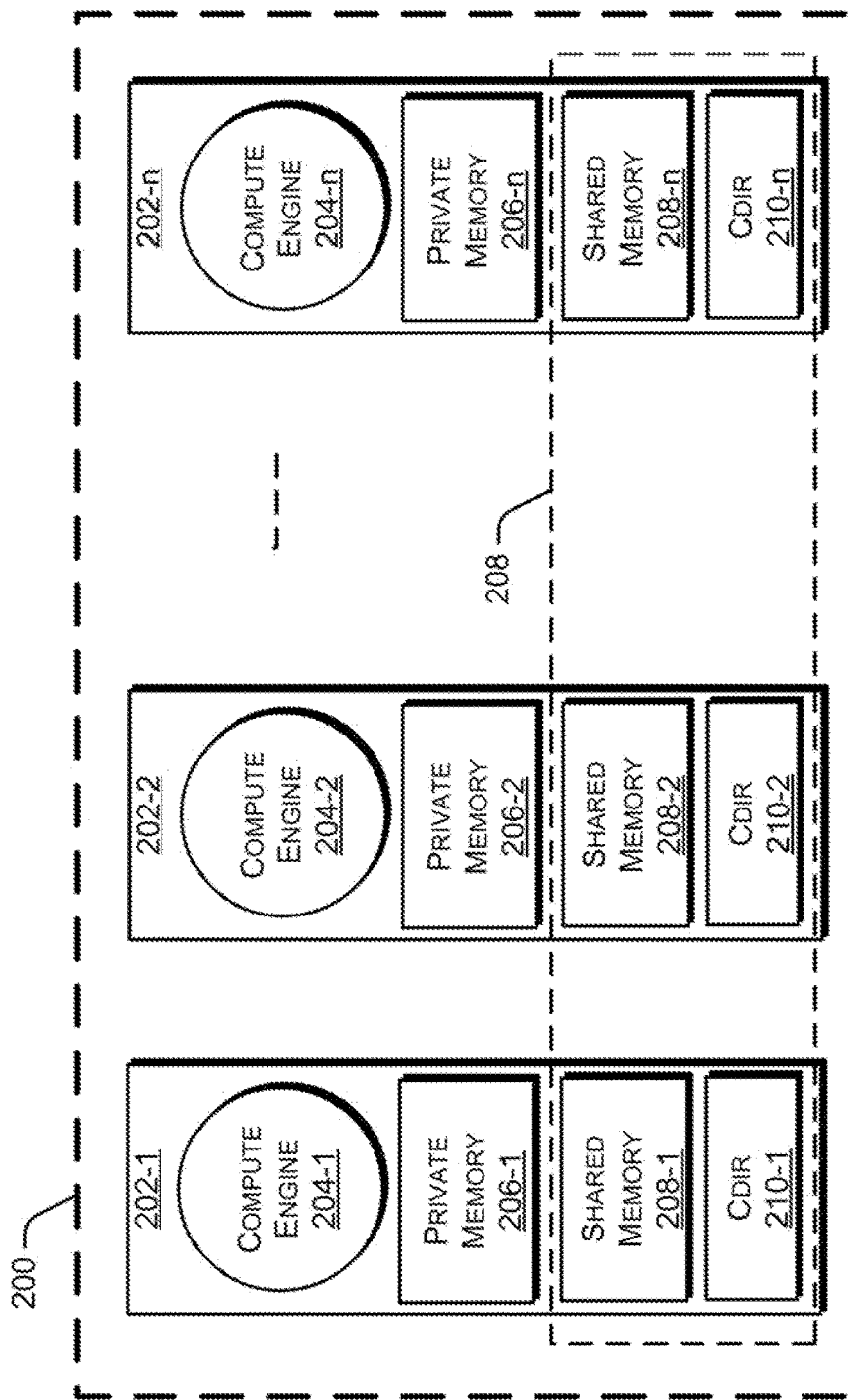
FIG. 2A illustrates a multi-compute-engine system, according to an example of the present subject matter.

FIG. 2A illustrates a multi-compute-engine system 200, in accordance with an example of the present subject matter. Examples of the multi-compute-engine system 200, also referred to as a system 200, may include chip multi-processors (CMPs), multi-core systems, and multi-processor systems that comprise multiple cores or processors on an integrated circuit (IC).

As shown in FIG. 2A, the system 200 includes multiple tiles 202-1, 202-2 . . . 202-n that may be communicatively coupled to each other. Each of the tiles 202-1,202-2 . . . 202-n comprise one or more compute engine 204-1, 204-2 . . . 204-n, such as a core or processor. The core or processor may be implemented as one or more microprocessors, microcomputers, microcontrollers, digital signal processors, central processing units, state machines, logic circuitries, and/or any systems that manipulate signals based on operational instructions. Among other capabilities, the core or processor may be configured to fetch and execute computer-readable instructions stored in a memory.

In the system 200, to reduce access latency for the most frequently requested data, two or more levels or cache representing a cache hierarchy is implemented. The cache hierarchy generally comprises one or two levels of aches that are private to each compute-engine 204-1, 204-2 . . . 204-n and additionally one or more levels of shared cache. The shared cache may be shared among the multiple compute-engines and the data in the shared cache may be non-inclusive with respect to the data contents of the private caches. Thus, in one example, the system 200 may have a shared distributed memory configuration, where a lower level cache in the cache hierarchy may be accessed by multiple processors of the system. The system 200 may include a cache coherence directory at the shared cache to maintain cache coherence amongst the private caches.

Accordingly, as shown, each of the tiles 202-1, 202-2 . . . 202-n comprise the compute engine 204-1, 204-2 . . . 204-n, with one or more levels of private caches, referred to as private memory 206-1, 206-2 . . . 206-n and a shared cache, referred to as the shared memory 208-1, 208-2 . . . 208-n. In an example implementation, to maintain cache coherency in the system 200, data of the shared memory 208-1, 208-2 . . . 208-n that may have been cached in a private memory 206-1, 206-2 . . . 206-n is tracked. In an example implementation, the system 200, includes a concise cache coherence directory 210-1, 210-2 . . . 210-n associated with each of the compute engine 204-1, 204-2, . . . 204-n, to track the data of the shared memory 208-1, 208-2 . . . 108-*n*, together referred to as a shared distributed memory 208, for maintaining cache coherence in the system 200, In one example implementation, the concise cache coherence directory 210-1, 210-2, . . . 210-*n* associated with each of the respective compute engine 204-1, 204-2 . . . 204-*n*, is implemented in the corresponding shared cache 208-1, 208-2 . . . 208-*n*.

The concise cache coherence directory 210-1, 210-2 . . . 210-*n* is explained below in context of an example implementation of the system 200 as a multi-core processing system 212. The example of a multi-core processor is only for the ease of explanation and the same should not be construed as a limitation. The concise cache coherence directory 210-1, 210-2 . . . 210-*n* may be implemented in, any multi-compute-engine system where multiple cores or processors have access to the same memory.

Figure 2B:
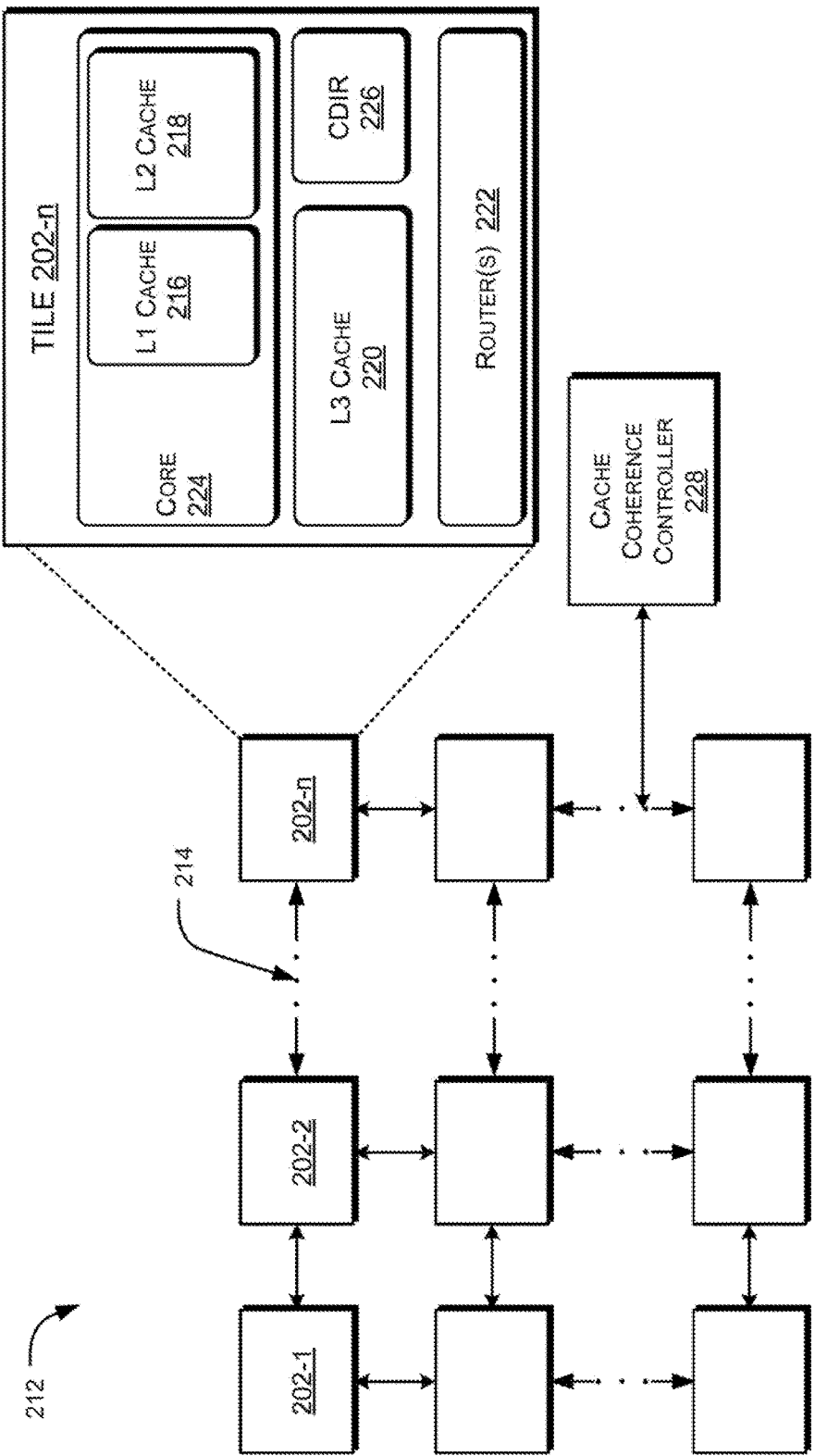
FIG. 2B illustrates a multi-core processing system, according to an example of the present subject matter.

FIG. 2B shows a multi-core processing system 212 including multiple tiles 202-1, 202-2 . . . 202-*n*, each having a core. An interconnector 214 is provided to communicatively couple the tiles 202-1, 202-2 . . . 202-*n* to each other. Alike, the system 200, system 212 too comprises a cache hierarchy of private and shared caches. The cache hierarchy generally comprises L1 and L2 caches that are private to each compute-engine 204-1, 204-2, . . . 204-*n*. In addition to the private caches, to increase the cache capacity, a shared cache or an L3 cache may also be implemented. The L3 cache may be shared among the multiple compute-engines and the data in the L3 cache may be non-inclusive with respect to the data contents of the private L1 and L2 caches.

FIG. 2B illustrates the tile 202-*n* in an exploded view to depict the components of the tile 202-*n*. In an example implementation, all the tiles 202-1, 202-2 . . . 202-*n* of the system 212 have the same configuration and include the same components. In the example implementation illustrated in FIG. 2B, the tile 202-*n* includes an L1 cache an L2 cache 218 and an L3 cache 220. The tile 202-*n* also includes rout 222 to couple the tile 202-*n* to the interconnector 214. The L1 cache 212 and L2 cache 218 are private and coherent to a core 224 of the tile 202-*n* while the L3 cache 220 is shared across one or more cores of the system 212.

The system 212 includes a concise cache coherence directory at the L3 cache 220 associated with each, of the cores of the system 212 to track data of the L3 cache 220 in a private cache of any of the cores of the system 212. As shown, the core 224 includes the concise cache coherence directory 226 at the L3 cache 220 of the tile 202-*n*. In an example implementation, the concise cache coherence directory 226, abbreviated as CDir 226, is concise and occupies substantially less storage space. In an example, the CDir 226 of the core 224 may track the data of the L3 cache 220 to maintain cache coherence of the data of the L3 cache 220 with respect to a private cache of any of the cores of the system 212, including the L1 cache 216 and the L2 cache 218 of the core 224. The CDir 226 of the core 224 may be shared amongst the multiple cores of the system 212.

In one example, a cache coherence controller 228, implementing cache coherency protocols to provide cache coherence amongst the various cores of the system 212, may be associated with the tiles 202-1, 202-2 . . . 202-*n* to maintain the concise cache coherence directories associated with each of the cores of the system 212. For example, the cache coherence controller 228 may maintain the cache coherence directories to track sharing of data of the shared memory, i.e., L3 cache of each of the cores of the system 212, amongst the various cores of the system 200. In other words, the cache coherence controller 228 may maintain cache coherency in the system 212 based on one or more concise cache coherence directories associated with each of the cores of the system 212, for example, the concise cache coherence directory 226 of the core 224.

Though the figure depicts, the CDir 226 of the tile 202-*n*, as explained, in the system 212 having a shared distributed memory configuration, each of the tile may have a CDir that may be associated with a respective cores of the system 212 and may be provided at the lower level cache of the respective cores. The CDir 226 is explained in details in reference to FIGS. 3A, 3B, 4A, 4B, and 4C in the description below.

Figure 3A:
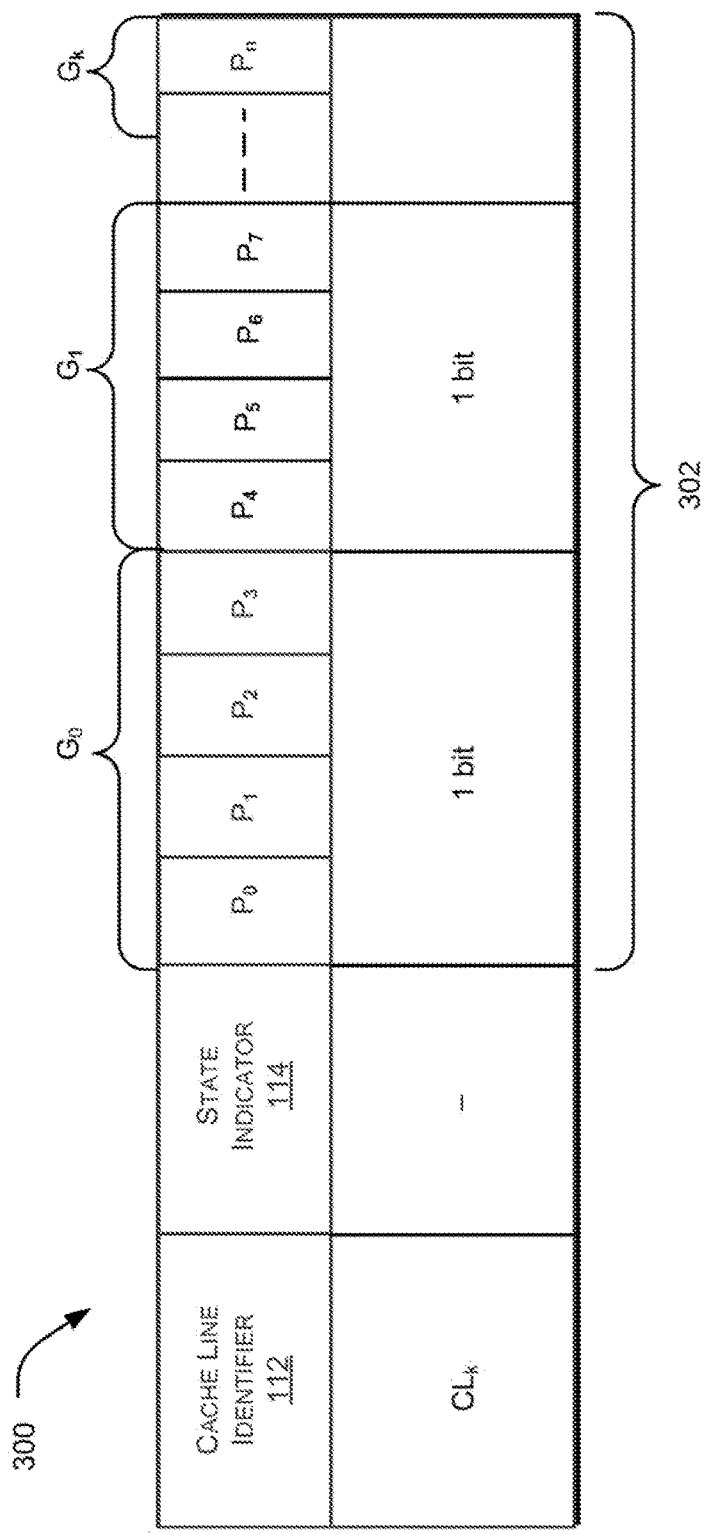
FIGS. 3A and 3B illustrate a partial concise cache coherence directory, according to an example of the present subject matter.
Figure 3B:
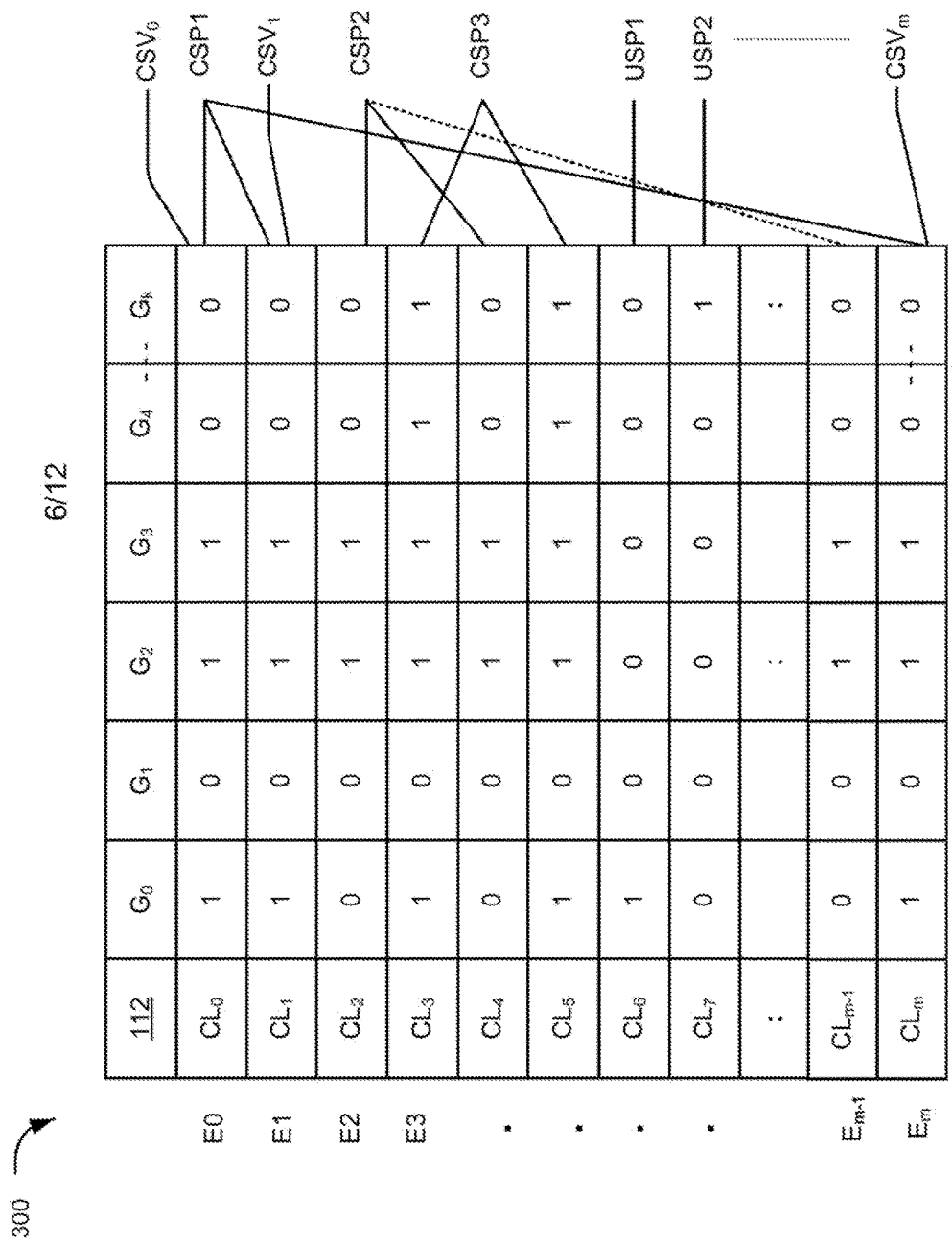

In accordance with an example implementation, the CDir 226 may be explained based on a two-fold approach, wherein, on one hand, the size of the sharing vector is reduces and, on the other, the number of entries to the CDir 226 is reduced, For the ease of explanation, the two-fold approach may be explained, such that in a first step a partial CDir 300, as illustrated in FIG. 3A and FIG. 3B, may be implemented.

As mentioned above, the CDir 226 provides for reducing the size of the sharing vector. For this purpose, a concise sharing vector 302 that represents more than one processor or core of the system 200 in one bit may be incorporated in the partial CDir 300.

FIG. 3A is a schematic representation of an entry ($E_k$) of the partial CDir 300 depicting the sharing pattern of a cache line ($CL_k$) amongst a plurality of compute engine, such as cores or processors. The entry ($E_k$) comprises the cache line identifier 112 and state indicator 114. Further, as depicted, instead of having a sharing vector that includes one bit corresponding to each processor (P0, P1 . . . Pn), which results in the size of each of the sharing vector being equal to the number of processors, as depicted, the partial CDir 300 comprises a concise sharing vector 302 that use one bit corresponding to a group of processors (G0, G1 . . . Gk).

Accordingly, if, in one example, 64 processors are grouped into 16 groups having 4 processors each, the size of each of the concise sharing vector 302 is reduced from 64 bits to 16 bits. Thus, the grouping of the processors reduces the size of the concise sharing vector 302 by a factor of number of processors in a group. In one example, when a bit corresponding to a group of processors is set to '1' in the concise sharing vector 302, it indicates the presence of the data with at least any one of the processors in that group. In such a case, all the processors in the group are searched for the data. In one example, the grouping of processors may be based on the behavior of the processors. For example, processors that frequently cache a common set of cache lines may be grouped together. For instance, adjacent or neighboring cores on a chip may be grouped.

Along with the reduction in size of the sharing vectors, explained using the partial CDir 300, the number of entries to the CDir 226 is also reduced for further reduction storage space. Generally, a cache coherence directory is based on a per-cache-line representation which includes one entry per cache line. Accordingly, the number of entries or number of rows in such a directory corresponds to the number of cache lines. However, it is often observed that many workloads exhibit frequent sharing patterns and region-level sharing patterns in a coarse-grained region. Examples of such workloads include big data workloads, such as MemcacheD. In such applications, it is observed that a small number of sharing patterns are frequently repeated in a coarse-grained region. In accordance with one example of the present subject matter, frequent sharing patterns and region-level sharing patterns may be leveraged to reduce the size of the CDir 226.

In one example, the CDir 226 may implement a region level representation instead of a per-cache-line representation. Consequently, the CDir 226 includes a number of entries that is significantly less than the number of cache lines. This may be further explained in reference to FIG. 3B illustrating the partial CDir 300 comprising multiple entries (E0, E1 . . . Em). The partial CDir 300 may be implemented for any shared memory page of the system 200. For the sake of simplicity, in the example illustrated in FIG. 3B, the partial CDir 300 may be considered to be implemented for a shared memory page 'ABC' having 'm' cache lines (CL0, CL21 . . . CLm) that may be shared amongst 'k' group of processors (G0, G1 . . . Gk). The sharing pattern associated with each of the cache lines (CL0, CL21 . . . CLm) is indicated against a cache line identifier 112 of the respective cache line by a concise sharing vector (CSV0, CSV1 . . . CSVn) included in the entry corresponding to the respective cache line (CL0, CL1 . . . CLm) in the partial CDir 300. Accordingly, in the present example, the partial CDir 300 includes 'm' entries, wherein each entry comprises a concise sharing vector (CSV0, CSV1 . . . CSVm) for indicating the sharing pattern of the cache line (CL0, CL21 . . . CLm) to which the entry corresponds.

In an example implementation, a frequent sharing pattern and a region-level sharing pattern may be observed in the shared memory page 'ABC'. Accordingly, instead of each of cache lines (CL0, CL21, . . . CLm) of the shared memory page 'ABC' having a distinct sharing pattern, many regions of the shared memory page 'ABC' may be observed to have a common sharing pattern. Thus, in said example, though the possibility of maximum of 'm' distinct sharing patterns arising exists, a small number, for example, up to 5, of common sharing patterns may be observed to be repeated for many blocks.

For the CDir 226 to be implemented for the shared memory page 'ABC', a predetermined number of most frequently occurring common sharing patterns are identified. Referring to the above example, 3 most frequently repeating common sharing patterns out of the 5 common sharing patterns occurring in the shared memory page 'ABC' are identified. In, one example, the predetermined number may be selected for implementation of the CDir 226 based on the size of the CDir 226.

In FIG. 3B, three most frequently repeating common sharing patterns, in other words, the common sharing pattern that repeats the highest number of times, second highest number of times and third highest number of times, are designated as a first common sharing pattern, CSP1; a second common sharing pattern, CSP2; and a third common sharing pattern, CSP3. As shown, the common sharing pattern CSP1 is repeated for the cache lines CL0, CL1 and CLm. Similarly, a second and a third common sharing pattern CSP2 and CSP3 are repeated for the cache lines CL2, CL4 and CLm−1 and cache lines CL3 and CL5, respectively. The common sharing pattern may be repeated for many cache lines though the Figure depicts only few of those cache lines. The cache lines CL6 and CL7 have a respective uncommon sharing pattern USP1 and USP2. The uncommon sharing pattern is a sharing pattern other than the predetermined number of common sharing patterns. It may be noted that more common and uncommon sharing patterns, apart from the illustrated sharing patterns, which have not been shown in the Figure for the ease of depiction, may exist.

In one example, the most common sharing patterns may be identified based on full-map sharing vectors, sharing vectors that include one bit per processor. In an example, the most common sharing patterns may be identified based on the sharing vectors of a cache coherence directory such as directory 110, explained previously. Accordingly, in some examples, the common sharing patterns may be identified based on the processors, while in other examples the identification may be based on groups of processors.

Upon identification of the predetermined number of common sharing patterns, sets of cache lines are formed. The cache lines that are associated with one of the identified common sharing patterns are aggregated into a set. The number of sets of cache lines so formed is equal to the predetermined number and each set includes all the cache lines having one of the identified common sharing patterns, Referring again to FIG. 3B, the cache lines CL0, CL1 and CLm associated with the first common sharing pattern CSP1 may form the first set of cache lines, Similarly, the cache lines CL2, CL4 and CLm−1 and cache lines CL3 and CL5 associated with the second and third common sharing pattern CSP2 and CSP3, respectively, may form the second and third set of cache lines. The CDir 226 includes an entry for each such set of cache lines. Thus, unlike other approaches where cache coherence directories include one entry per cache line, the CDir 226 aggregates the set of cache lines associated with an identified common sharing pattern into one entry. The CDir 226 is further discussed in details below in reference to FIGS. 4A, 4B, and 4C.

Figure 4A:
FIG. 4A illustrates a concise cache coherence directory for cache coherence in a multi-compute-engine system, according to an example of the present subject matter.

FIG. 4A illustrates a concise cache coherency directory (CDir) 400 for a multi-compute-engine system, in accordance with one example of the present subject matter. Though the CDir 400 may be incorporated in any multi-compute-engine system, for the ease of explanation, the implementation of the CDir 400 herein is described in context of the system 200 and in reference to the foregoing examples provided in relation to the system 200.

The CDir 400 includes CDir entries 402. Each CDir entry 402 may be a common pattern aggregated entry or an uncommon pattern aggregated entry. A CDir entry 402 may be a common pattern aggregated entry when associated with a set of cache lines associated with one of the identified common sharing pattern. Accordingly, the number of common pattern aggregated entries is some as the predetermined number of common sharing patterns that have been selected for representation in the CDir. Further, all the other cache lines that have an uncommon sharing pattern are also aggregated into an entry, referred to as an uncommon pattern aggregated entry, of the CDir 400.

In one example, each set of cache lines aggregated into a common pattern aggregated entry may be compressed when stored in the CDir 400. Accordingly, the CDir entries 402 for common pattern aggregated entries may comprise aggregated cache line identifiers 404 that indicate the address of the set of cache lines, which have been aggregated in that entry, in an encoded form to make the CDir 400 more space efficient. In other words, cache line identifier 112 associated with each of the one or more cache lines relating to the common pattern aggregated entry may be compressed in the aggregated cache line identifiers 404. In cases where region-level sharing pattern is observed, the cache lines having a common sharing pattern are mostly continuous and their addresses may be compressed in the aggregated cache line identifiers 404 of the respective CDir entries 402.

Further, in the CDir 400, each CDir entry 402 includes a pattern vector 406. The size of the pattern vector 406 is in proportion to the predetermined number of common sharing patterns that have been selected for representation in the CDir 400. The pattern vector 406 included in each of the common pattern aggregated entry is set to identify a common sharing pattern associated with the set of cache lines aggregated in that entry. While on the other hand, the pattern vector 406 in the uncommon pattern aggregated entry is set to indicate that each of the cache lines aggregated in uncommon pattern aggregated entry have an uncommon sharing pattern.

Discussing in context of the example of the shared memory page 'ABC' where three common sharing pattern, namely the first, second and third common sharing pattern CSP1, CSP2 and CSP3 are identified as the most frequently repeating sharing patterns, the pattern vector 406 may have a size of 2-bits The bits of the pattern vector 406 may be set to '01', '10' and '11' to identify the first, second and third common sharing pattern CSP1, CSP2 and CSP3, respectively, in the common pattern aggregated entries corresponding to the first, second and third set of cache lines. Further, the pattern vector 406 included in the uncommon pattern aggregated entry is set to '00'. Referring to the previous example, the set of cache lines CL6 and CL7 that have an uncommon sharing pattern may be represented by bits of the pattern vector 406 set to '00'.

The pattern vector 406, thus, indicates whether a cache line is associated with an identified common sharing pattern or an uncommon sharing pattern. In one example, the pattern vector 406 set in the common pattern aggregated entries may be translated into full-map sharing vectors for example, through pointers, translation tables or any other translation schemes to indicate who the sharers are. While, for the cache lines aggregated in the, uncommon pattern aggregated entry, a per-cache line based directory may be maintained. Thus, in a CDir 400 look-up for a cache line, if a pattern vector indicates that the cache line does not have any of the identified common sharing patterns, the per-cache line based directory may be looked into to obtain the sharing information.

Figure 4B:
FIG. 4B shows a sharing pattern table associated with a concise cache coherence directory for cache coherence in a multi-compute-engine system, according to an example of the present subject matter.

In one example, the pattern vector 406 is translated using a sharing pattern table 408 as shown in FIG. 4B. The pattern vector 406 included in each common pattern aggregated entry of the CDir 400 acts as an index to an entry in the sharing pattern table 408. The sharing pattern table 408 comprises sharing patterns 410 indicative of the sharing information, i.e., which cache line has been cached by which processor of the system 200.

In another example, in accordance with the present subject matter. the CDir 400 may include the sharing information as well. FIG. 4C illustrates the CDir 400 incorporating the sharing information, in accordance with one example of the subject matter. As depicted in FIG. 4C, each of the CDir entries 402 for common pattern aggregated entry comprises the sharing pattern 410 for the cache Ones aggregated in that entry. Thus, the CDir 400 incorporates the identified common sharing patterns in the respective common pattern aggregated entries. Further, in one example, for the uncommon pattern aggregated entry the CDir 400 may incorporate a pointer 412 that holds the address of the per-cache line based directory.

In one example, the per-cache line based directory may be a full-map sharing vector based directory or a coarse-grained sharing vector based directory. Thus, based on the configuration, the per-cache line based directory may comprise full-map sharing vectors or concise sharing vectors. As explained previously, the full-map sharing vectors include one-bit to represent each processor. The coarse-grained sharing vectors are concise sharing vectors that represent more than one processors or a group of processors per bit of the sharing vector.

As evident, when used in conjunction with the CDir 400, in one example, the per-cache line based directory may comprise the sharing information of only those cache lines that have an uncommon sharing pattern. Excluding cache lines having the identified common sharing patterns from the per-cache line based directory provides for significant reduction in storage overhead. Since a majority of the cache lines may be associated with one of the identified common sharing patterns and may, therefore, be aggregated in the common pattern aggregated entries in the CDir, the size of the per-cache line based directory is substantially smaller than it would have been in a case where the per-cache line based directory would have included sharing information for all the cache lines.

Although the examples of the CDir 400 described above refer to an implementation based on a consideration of representing three most common sharing patterns in the CDir, various other examples are possible. For example, based on the region-level sharing pattern and frequent sharing pattern exhibited by the workloads that may be executed on a system having multiple-compute engines, such as processor and cores, various implementations of the CDir 400 incorporating pattern vectors of different sizes may arise. For example, a pattern vector having a size of 3-bits may be used to represent more than three and up to seven most frequently occurring common sharing patterns in a CDir 400. For example, while using the 3-bit pattern vector in a CDir 400, five common sharing patterns may be identified and represented in the CDir 400 by five different combinations of the bits of the pattern vector, while one combination out of the remaining three different combinations of the bits of the pattern vector may be used to represent the uncommon sharing pattern.

The cache coherence controller 216 of the system 200 uses the sharing pattern 410 to maintain cache coherence in the system 200. In one example, the cache coherence controller 216 also performs exception handling. For example, the cache coherence controller 216 may maintain the per-cache line based directory. In cases where a pattern vector indicates that a cache line does not have any of the identified common sharing patterns, the per-cache line based directory may be looked into to obtain the sharing information.

Further, in accordance with the present subject matter, in an example, the CDir 400 may be used to reduce latency overhead involved in maintaining cache coherence in multi-compute-engine systems. For ease of explanation of latency overhead reduction, FIGS. 5A and 5B which illustrate a multi-core processing system 500, may be referred.

Figure 5A:
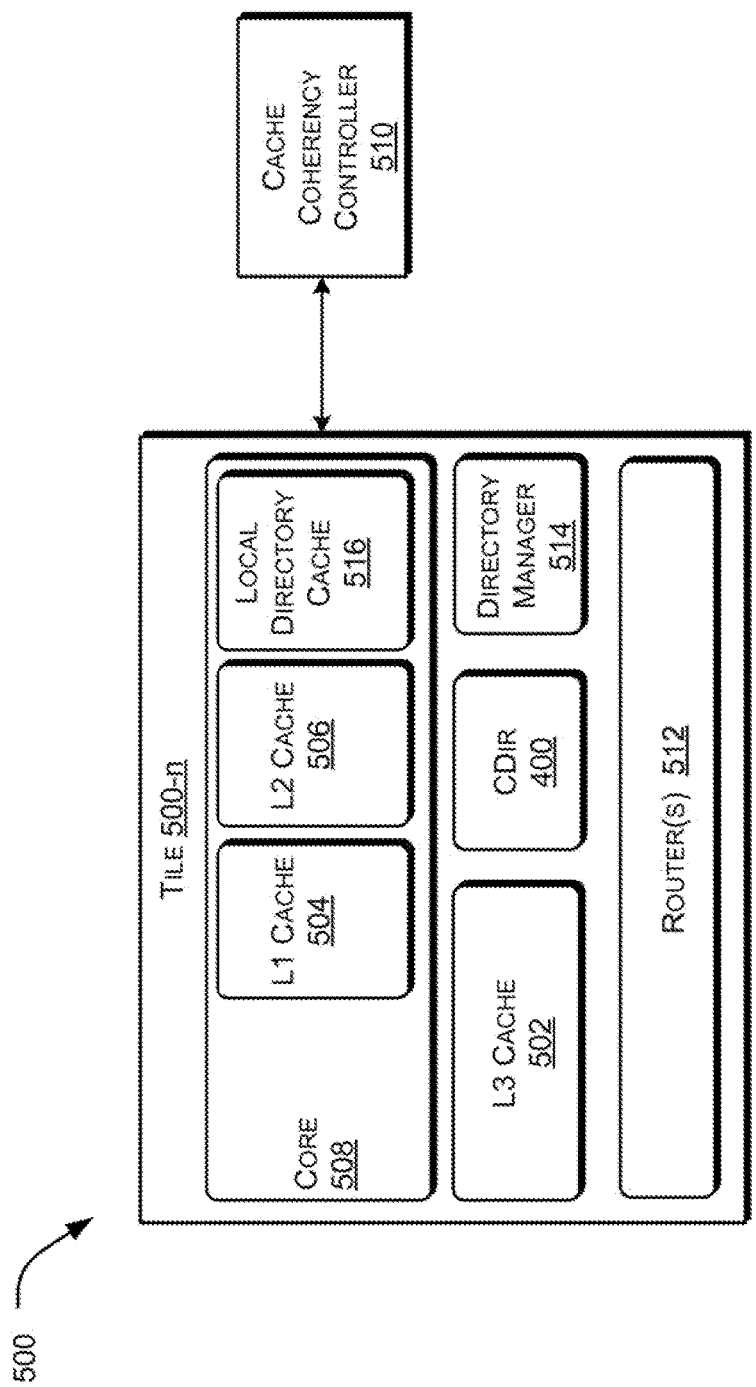
FIGS. 5A and 5B illustrate a multi-core processing system implementing a concise cache coherence directory for cache coherence, in accordance with an example of the present subject matter.
Figure 5B:
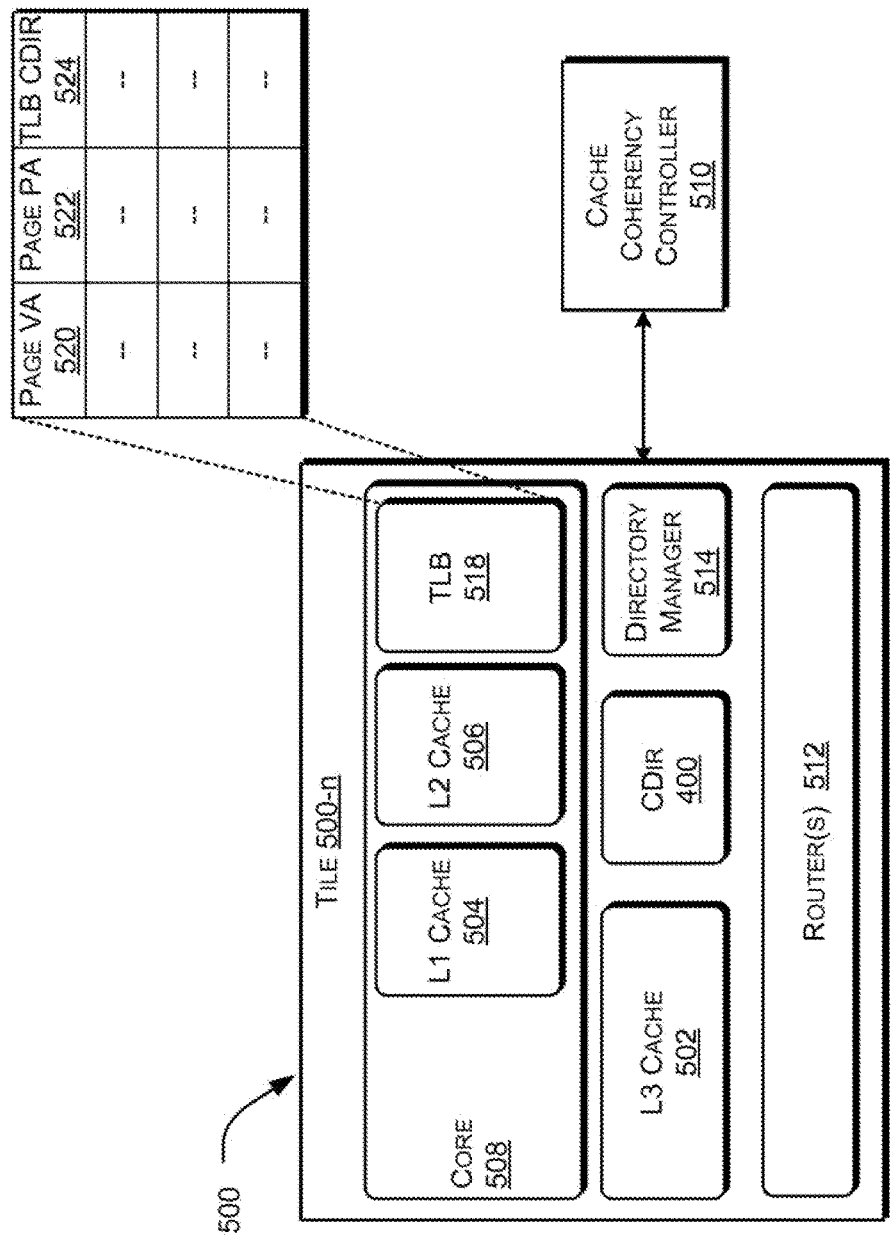

FIG. 5A illustrates a multi-core processing system 500, referred to as system 500, comprising a plurality of tiles each having a core. In the illustrated example, a the 500-*n* of the system 500 implementing the CDir 400 for cache coherence, in accordance with an example of the present subject matter, is shown.

As described previously, in multi-compute-engine systems, such as the system 500 that comprise multiple compute-engines, each of the multiple compute-engines may have a CDir to maintain coherence between a shared memory and a private and coherent cache in the cache hierarchy of the multiple compute-engines. In the illustrated example, the CDir 400 is implemented at an L3 cache 502 to maintain cache coherence for private and coherent caches, L1 cache 504 and L2 cache 506, of a compute-engine, such as a core 508 of the system 500. A cache coherence controller 510, may be coupled to the multiple compute-engines to maintain cache coherence in the system 500. The core 508 may be coupled to the cache coherence controller 510 through a router 512.

In one example, the tile 500-*n* may comprise a directory manager 514 associated with the CDir 400 to reduce latency overhead involved in maintaining cache coherence in the system 500. In accordance with one example of the present subject matter, the directory manager 514 may cache the CDir 400 within one or more of the multiple compute-engines of the system 500. In an example, the CDir 400 may be cached within the core 508, another example, the CDir 400 may be cached within any other core, apart from core 508 of the system 500. The CDir 400 implemented in accordance with the present subject matter has a substantially small size and may be cached in a core. In one example implementation, each of the cores of the system 500, may include a hardware structure, referred to as a local directory cache, such as the local directory cache 516 of the core 508. The CDir 400 of the tile 500-*n* may be cached in the local directory cache of any of the tiles of the system 500 including the local directory cache 516 of the core 508.

The CDir cached locally in a core enables reduction in latency overhead since a large fraction of directory lookups can be satisfied locally without accessing a CDir at the L3 cache of the core or the CDir at the L3 cache of any other core in any other tile of the system 500. For instance, based on the sharing pattern 410 of a cache line, if it is detected that one of the cores of the system 500 has changed the data associated with the cache line, the home node of the cache line, which is responsible for maintaining coherence for that cache line, is determined. Determination of the home node in such cases, is generally done in a round robin manner which involves latency overhead. The CDir cached locally in a core, eliminates the need for such directory lookups.

Further, in one example the CDir 400 may be cached in a translation look aside buffer (TLB) of any of the multiple compute-engines of the system 500. As discussed, the size of the CDir 400 implemented in accordance with the present subject matter is significantly small allowing it to be cached in the TLB of a core. A CDir incorporated in the TLB of a core is explained in reference to FIG. 5B implementing a cache, of a CDir in a TLB 518 of the core 508. A TLB of a computing, system provides a compute-engine with page address translation information.

In one example implementation, the Dir of a core may be cached in a TLB of a remote core of the system 500. The remote core may be any other core of the system 500 other than the core to whose L3 cache the CDir s associated with. For example, the TLB 518 of the core 508 may have a cached version of a CDir of a remote core, i.e., any core other that the core 508. In other words the TLB 518 of the core 508 may have a cached version of any CDir of the system 500 excluding CDir 400 of the core 508. Accordingly, in the illustrated example, the TLB 518 includes a mapping of page virtual addresses (VA) 520 and page physical addresses (PA) 522, to provide page address translation information to the core 508, along with a cached version of a CDir of a remote core. The cached version of the CDir of the remote core in the TLB 518 is referred to as a TLB CDir 524.

In one example, when a TLB entry for the TLB 518 is filled, the TLB CDir 524 may also be populated by the core 508. Likewise, the remote core in which the CDir 400 of the core 508 is cached, may manage the cached CDir together with its TLB. Managing the locally cached CDir together with the TLB of the core makes a large fraction of the sharing pattern available to the cores locally thereby improving latency overheads. In one example, the directory manager 514 may also implement techniques for synchronizing the CDir cached in the local directory cache 516 and the TLB CDir 518 with the Coir 400.

Figure 6:
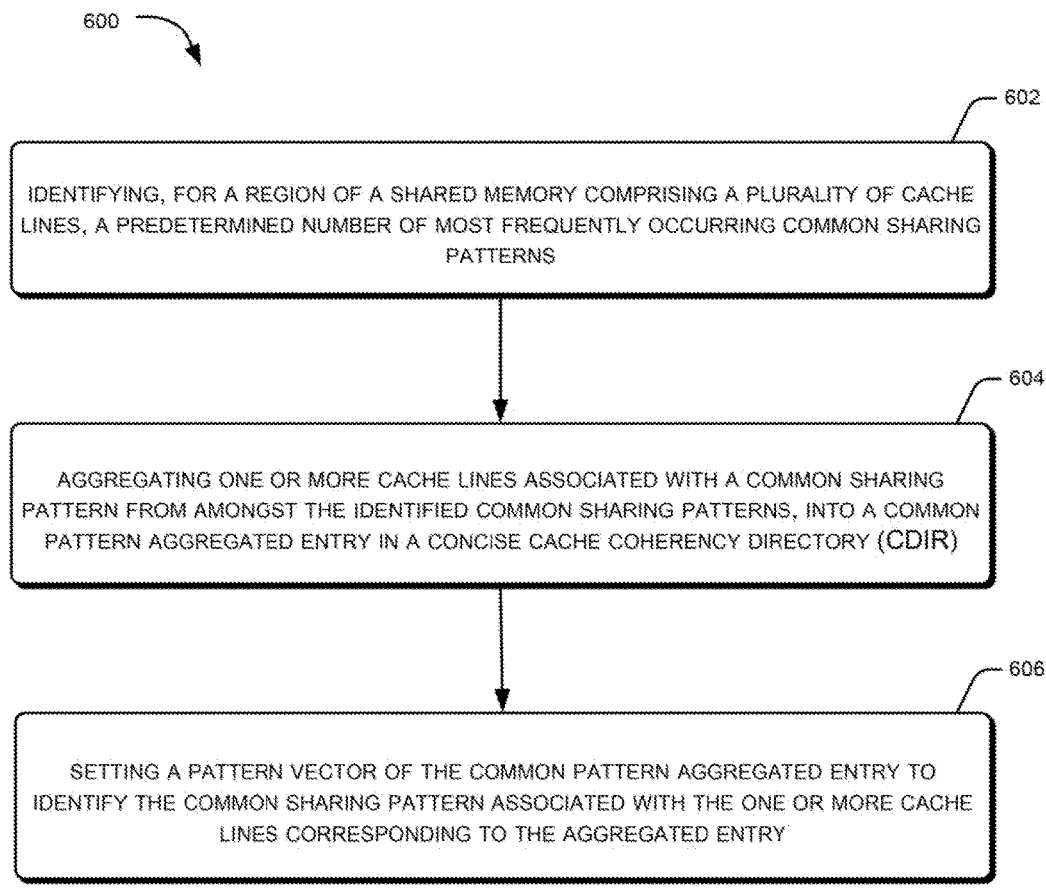
FIG. 6 illustrates a method of maintaining cache coherence multi-compute-engine systems, in accordance with an example of the present subject matter.

FIG. 6 illustrates a method 600 of maintain g cache coherence in multi-compute-engine systems, according to an example of the present subject matter. The order in which the method 600 is described is not intended to be construed as a limitation, and any number of the described method blocks can be combined in any order to implement the method 600 or an alternative method. Additionally, individual blocks may be deleted from the method 600 without departing from the spirit and scope of the subject matter described herein.

Furthermore, the method 600 can be implemented by processor(s) or computing systems in any suitable hardware, non-transitory machine readable instructions, or combination thereof. It may be understood that steps of the method 600 may be executed based on instructions stored in a non-transitory computer readable medium as will be readily understood, The non-transitory computer readable medium may include, for example, digital data storage media, digital memories, magnetic storage media, such as a magnetic disks and magnetic tapes, hard drives or optically readable digital data storage media.

Further, although the method 600 ay be implemented in various multi-compute-engine systems, in examples described in FIG. 6 are explained in context of the aforementioned multi-compute-engine system 500 for the ease of explanation.

Referring to FIG. 6, at block 602, for a plurality of cache lines in a region of a shared memory, a predetermined number of most frequently occurring common sharing patterns associated with the cache lines of the shared memory are identified. A sharing pattern associated with each of the plurality of cache lines in the region is indicative of information of sharing of each of the plurality of cache lines amongst a plurality of sharers. For example, out of 10 common sharing patterns that are observed in a shared memory page, the top 5 most common or most frequently repeating sharing patterns may be identified.

At block 604, one more cache lines associated with each one of the identified common sharing pattern are aggregated into an entry in a concise cache coherency directory (CDir). A CDir entry for a set of cache lines may be referred to as a common pattern aggregated entry. Thus, a predetermined number of common pattern aggregated entries, each indicative of the set of cache lines that have one of the identified common sharing pattern, are included in the CDir.

At block 606, a pattern vector of the common patter aggregated entry in the CDir is set. The pattern vector may be set to identify the common sharing pattern, from amongst the identified common sharing patterns, associated with the set of cache lines corresponding to the common pattern aggregated entry in the CDir.

The CDir may also include one or more uncommon pattern aggregated entry for the cache lines that have a sharing pattern different from the identified common sharing patterns. The pattern vector for the uncommon pattern aggregated entry is set to indicate the cache lines aggregated in the uncommon pattern aggregated entry have an uncommon sharing pattern.

Thus, the CDir may convey whether a cache line is associated with the identified common sharing pattern or an uncommon sharing pattern. In an example, a pattern vector included in a common pattern aggregated entry of the CDir may be translated into full-map sharing vectors through pointers, translation tables or any other translation schemes to identify the sharers of the cache line while a per-cache line based directory may be used to obtain the sharing information for the cache lines aggregated in the uncommon pattern aggregated entry.

Figure 7:
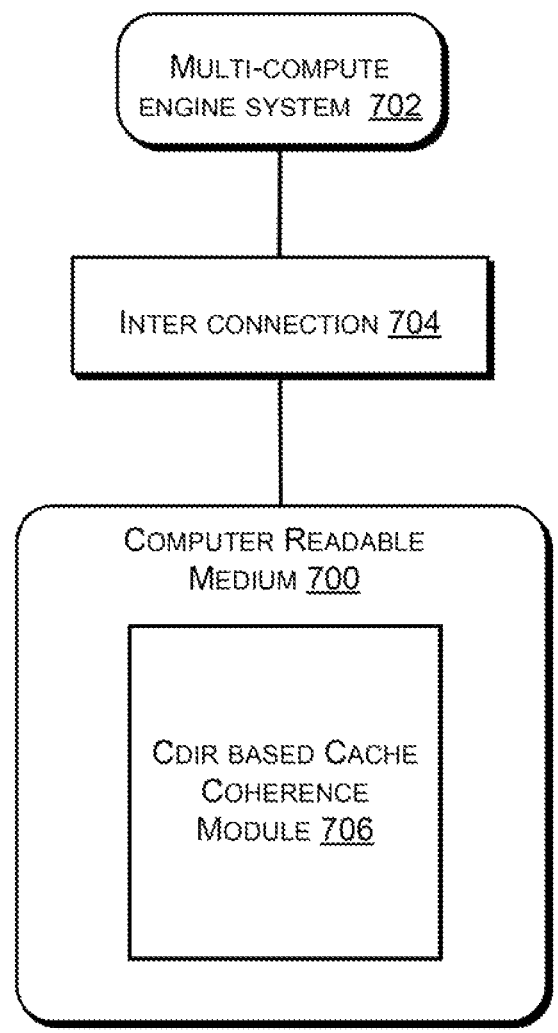
FIG. 7 illustrates a computer readable medium storing instructions for maintaining cache coherence in multi-compute-engine systems, according to an example of the present subject matter.

FIG. 7 illustrates a computer readable medium 700 storing instructions for maintaining cache coherence in multi-compute-engine systems, according to an example of the present subject matter. In an example, the computer readable medium 700 is communicatively coupled to a multi-compute-engine system 702 through an interconnection 704.

For example, the multi-compute-engine system 702 may be a computing device, such as a server, a laptop, a desktop, a mobile device, and the like. The computer readable medium 700 may be, for example, an internal memory device or an external memory device. In an example implementation, the interconnection 704 may be a direct communication link, such as any memory read/write interface or a network-based interface.

Further, the computer readable medium 704 includes a CDir based cache coherence module 706. The CDir based cache coherence module 706 may comprise computer readable instructions that, when executed, cause the multi-compute-engine system 702 to implement a concise cache coherence directory, such as CDir 400 explained previously.

In accordance with the present subject matter, computer readable instructions that, when executed, cause the multi-compute-engine system 702 to identify a predetermined number of most frequently repeating common sharing patterns from amongst a plurality of sharing patterns each associated with cache lines of a shared memory of the multi-compute-engine system 702. Further, a common pattern aggregated entry for a set of cache lines that have one of the identified common sharing patterns is incorporated in the CDir and the pattern vector of the common pattern aggregated entry is set. The pattern vector once set may point to the identified common sharing pattern associated with the common pattern aggregated entry in a sharing pattern table.

Although implementations for methods and systems for providing cache coherence in multi-compute-engine systems have been described in language specific to structural features end/or methods, it is to be understood that the appended claims are not necessarily limited to the specific features or methods described. Rather, the specific features and methods are disclosed as examples of systems and methods for providing cache coherence in multi-compute-engine systems.

What is claimed is:

1. A multi-compute-engine system comprising:
  a plurality of compute-engines, each having a private memory;
  a shared memory coupled to the plurality of compute-engines;
  a concise cache coherence directory associated with a compute-engine, from amongst the plurality of compute-engines, to track sharing of data of the shared memory amongst the plurality of compute-engines, the concise cache coherence directory comprising:
    at least one common pattern aggregated entry, wherein each of the at least one common pattern aggregated entry relates to a set of cache lines of the shared memory having a sharing pattern from amongst a predetermined number of most frequently occurring common sharing patterns;
    at least one uncommon pattern aggregated entry, wherein each of the uncommon pattern aggregated entry relates to a set cache lines of the shared memory having a sharing pattern other than the predetermined frequent common sharing patterns; and
    a pattern vector included in each of the at least one common pattern aggregated entry and each of the at least one uncommon pattern aggregated entry, wherein the pattern vector is indicative of information of sharing of the data of the shared memory amongst the plurality of compute-engines; and
  a directory manager associated with the concise cache coherence directory, wherein the directory manager caches the concise cache coherence directory within a translation look aside buffer (TLB) of a remote compute-engine, the remote compute-engine being another compute-engine from amongst the plurality of compute-engines, and wherein the remote compute-engine populates entries of the TLB and the concise cache coherence directory cached within the TLB together.

2. The multi-compute-engine system as claimed in claim 1, wherein the concise cache coherence directory comprises a sharing vector in each of the at least one common pattern aggregated entry, and wherein the sharing vector of a common pattern aggregated entry is the indicative of a common sharing pattern, from amongst the predetermined frequent common sharing patterns, associated with the common pattern aggregated entry.

3. The multi-compute-engine system as claimed in claim 1, further comprising a sharing pattern table, wherein the pattern vector included in each of the at least one common pattern aggregated entry corresponds to an entry in the sharing pattern table, the sharing pattern table comprising the predetermined number of most frequently occurring common sharing patterns.

4. The multi-compute-engine system as claimed in claim 1, further comprising a per-cache line based directory, wherein the pattern vector included in each of the least one uncommon pattern aggregated entry comprises a pointer to the per-cache line based directory.

5. The multi-compute-engine system as claimed in claim 4, wherein the per-cache line based directory comprises information of sharing of data of the set cache lines of the shared memory having a sharing pattern other than the predetermined frequent common sharing patterns.

6. The multi-compute-engine system as claimed in claim 4, wherein the per-cache line based directory is one of a coarse-grained sharing vector based directory and a full-map sharing vector based directory.

* * * * *